US006669171B1

United States Patent
Stunkard

(10) Patent No.: US 6,669,171 B1
(45) Date of Patent: Dec. 30, 2003

(54) COMPACT MANIFOLD TRUNNION BALL VALVE

(75) Inventor: Gerald A. Stunkard, Jenks, OK (US)

(73) Assignee: Aceco Valve, Inc., Mounds, OK (US)

( * ) Notice: Subject to any disclaimer, the term of this patent is extended or adjusted under 35 U.S.C. 154(b) by 0 days.

(21) Appl. No.: 09/431,299

(22) Filed: Oct. 29, 1999

(51) Int. Cl.[7] ................................................. F16K 5/06
(52) U.S. Cl. ............................ 251/315.08; 251/315.14
(58) Field of Search ........................ 251/315.08, 315.01, 251/315.04, 315.14

(56) References Cited

U.S. PATENT DOCUMENTS

| 3,038,489 | A |   | 6/1962  | Allen |
| 3,154,094 | A |   | 10/1964 | Bredtschneider et al. |
| 3,269,692 | A | * | 8/1966  | Shafer .............. 251/315.09 X |
| 3,288,430 | A | * | 11/1966 | Priese ................ 251/315.14 |
| 3,462,120 | A | * | 8/1969  | Priese ................ 251/315.14 |
| 3,463,449 | A | * | 8/1969  | Nelson et al. ...... 251/315.09 X |
| 3,480,253 | A |   | 11/1969 | Priese |
| 3,697,043 | A |   | 10/1972 | Baker |
| 3,705,707 | A |   | 12/1972 | Scaramucci |
| 3,771,545 | A |   | 11/1973 | Allen |
| 3,778,029 | A |   | 12/1973 | Baker |
| 3,893,469 | A |   | 7/1975  | Baker |
| 3,895,776 | A |   | 7/1975  | Laurens |
| 4,044,994 | A | * | 8/1977  | Priese .............. 251/315.08 X |
| 4,111,393 | A |   | 9/1978  | McClurg et al. |
| 4,134,595 | A | * | 1/1979  | Melville .......... 251/315.05 X |
| 4,135,545 | A | * | 1/1979  | Fowler et al. ..... 251/315.08 X |
| 4,137,936 | A | * | 2/1979  | Sekimoto et al. ... 251/315.08 X |
| 4,254,793 | A |   | 3/1981  | Scaramucci |
| 4,262,688 | A |   | 4/1981  | Bialkowski |
| 4,262,691 | A | * | 4/1981  | Kacal .............. 251/315.08 X |
| 4,280,522 | A | * | 7/1981  | Pechnyo et al. .... 251/315.02 X |
| 4,286,614 | A | * | 9/1981  | Kacal et al. ....... 251/315.08 X |
| 4,332,370 | A |   | 6/1982  | Williams |
| 4,342,444 | A |   | 8/1982  | Sonderman |
| 4,428,561 | A | * | 1/1984  | Thompson ......... 251/315.08 X |
| 4,477,055 | A | * | 10/1984 | Partridge .......... 251/315.08 X |

(List continued on next page.)

FOREIGN PATENT DOCUMENTS

DE            2328995            1/1974

OTHER PUBLICATIONS

FMC Fluid Control Systems Ball Valves Brochure, "*World Proven Valves for High Pressure Shutoff and Manifold Applications,*" Brochure BV–1/95, 1995. FMC Corporation.
KF Series NB/NC Manifold Component System Brochure, 1994. KF Industries, Inc.

*Primary Examiner*—John Bastianelli
(74) *Attorney, Agent, or Firm*—James L. Jackson; Andrews Kurth LLP

(57) ABSTRACT

A compact manifold ball valve having a valve body defining a valve chamber and having first and second ends and a first flow passage intersecting the valve chamber a cylindrical sealing surface defining a bonnet and valve stem passage also intersecting the valve chamber. A seat and ball retainer is threaded into the second end of the valve body and provides for support and positioning of a pair of trunnion support elements and a pair of seat assemblies. A valve ball having opposed trunnions is rotatable between open and closed positions within the valve chamber and is supported by the trunnion supports. A valve stem and bonnet assembly is secured and sealed to said valve body and is actuated to rotate the valve ball for opening and closing thereof. The valve seats are capable of metal-to-metal sealing with the valve ball in the event of heat destruction of said face seals to provide the valve with a fire-safe character. The seats incorporate high temperature graphite filament seals for fire-safe sealing between the valve seats and valve body in the event of heat destruction of said back seals. Other internal metal surfaces are arranged for metal-to-metal fire-safe sealing in the event the primary seals are destroyed by heat.

32 Claims, 9 Drawing Sheets

U.S. PATENT DOCUMENTS

| | | | |
|---|---|---|---|
| 4,523,608 A | 6/1985 | Miller | |
| 4,566,482 A | 1/1986 | Stunkard | |
| 4,637,421 A | 1/1987 | Stunkard | |
| 4,718,444 A | * 1/1988 | Boelte | 251/315.08 X |
| 4,867,414 A | * 9/1989 | Hubacek | 251/315.08 |
| 4,911,408 A | * 3/1990 | Kemp | 251/315.08 X |
| 5,275,191 A | * 1/1994 | Bernard | 251/315.08 X |
| 5,327,923 A | 7/1994 | Eischen et al. | |
| 5,752,690 A | 5/1998 | Ellett | |
| 5,927,687 A | * 7/1999 | Krause | 251/315.08 X |
| 6,065,736 A | 5/2000 | Hunt | |

* cited by examiner

COMPACT MANIFOLD TRUNNION BALL VALVE

BACKGROUND OF THE INVENTION

1. Field of the Invention

This invention relates generally to ball valves for use particularly in conduit manifold systems and more particularly concerns a compact manifold ball valve having fire-safe features to maintain the sealing integrity thereof when the valve has been subjected to sufficient heat for a sufficient period of time to destroy the elastomer and polymer sealing elements thereof. More particularly, the present invention is directed to a ball valve mechanism having a ball defining integral trunnions which are supported for rotation within the valve chamber by trunnion support and bearing assemblies which are free to shift and permit the valve ball element to be self-centering with respect to either of two seat assemblies that are disposed within seat pockets that are also defined by the valve body. Additionally, the present invention concerns a compact trunnion type ball valve having an actuating stem and a seat retainer which are blow-out proof even under conditions of fire.

2. Description Of The Prior Art

Compact manifold ball valves currently manufactured and used in manifold testing systems utilize floating balls and when in the closed position, produce excessive loads on the downstream seats, therefore creating high operating torques that are undesirable. These increased torques also cause excessive wear on the downstream seal and eventually destroy the same. In addition, gear operators or other types of actuators with high output torques are commonly required to operate this type of manifold valve, resulting in additional costs. It is desirable therefore to provide a ball valve mechanism which incorporates a mechanism for preventing downstream movement of the flow controlling ball element responsive to pressure and therefore eliminating excessive force of the valve ball against the downstream seat.

Another problem that is frequently present in test manifolds having ball valves for flow control is the fire hazard that is virtually always present. In the event of excessive heat from a fire, the elastomer seals and polymer seats of typical floating ball valves will likely be destroyed and the fluid within the flow lines will leak past the void seat pockets and may leak past the stem. This leakage can be sufficient to feed the fire when the valve is used for controlling a combustible fluid medium such as petroleum products. It is desirable therefore to provide a ball valve mechanism for use in flow controlling manifolds which incorporates a high temperature sealing capability to ensure product leakage to downstream of the valve mechanism or to atmosphere is controlled within a range of zero to minimum leakage rates as permitted by various industry fire test standards such as API Specification 6FA or other similar specifications in the event a condition of excessive heat is encountered.

The trunnion support elements have axial clearances with respect to the valve ball structure and with the valve body structure as shown in FIGS. 1, 2 and 5–9, which permit the valve ball, even though it is trunnion supported, to shift axially perpendicularly or horizontally and thus ensure precise centering of the valve ball and valve seats with respect to one another. This feature promotes efficient sealing engagement between the valve seats and valve ball when the valve is assembled and also enhance the metal-to-metal sealing capability of the valve mechanism in the event the seals of the valve should become damaged by excessive heat.

SUMMARY OF THE INVENTION

The "compact" nature of the ball valve mechanism of the present invention generally results from a short or compact valve body having opposed "open" ends each defining a flange closure seat which is engaged by and establishes sealing with a flange closure which may be defined by a flange of a pipe section of the manifold or other piping assembly. Since no other body closure members are provided, the overall length of the valve body is short and compact as compared with the valve body structures of the conventional ball valves. Thus, the compact manifold ball valves of the present invention is capable of being installed in piping systems such as the flow control manifolds of offshore production platforms where minimal space is available for valve installation. The compact trunnion type manifold ball valve described in this specification has a ball with integral opposing trunnions that rotate in trunnion bearing supports. The trunnion bearing supports contain a cylindrical sleeve type bearing to reduce friction during rotation of the ball from closed to open position or vice versa. The trunnion bearing supports are prevented from moving axially by one end abutting a precision machined shoulder in the valve body and the opposite end abutting the inner face of a threaded seat retainer. The trunnion bearing supports are free to shift in positions of axially, perpendicularly or horizontally sufficient to permit the ball to center into either seat assembly that is being pressure energized for positive sealing of the seat assembly insert to the ball spherical surface. This design eliminates the need for alignment pins or other means for the positioning of similar types of trunnion bearing supports offered in competitive ball valves. The load created by differential pressure when the ball is in a closed position is transmitted against the trunnion bearing rather than the downstream seat as in conventional floating ball valve designs, resulting in lower operating torque. The upstream seat load on the valve is very minimal in comparison to the load on the downstream seats in the floating ball valve designs. Actually, the reduction in seat load by using the trunnion type ball valve may be in the range of from about 60% to about 80% less, therefore minimizing wear and accomplishing longer service life of the valve seats as well as providing for lower maintenance costs as compared to floating ball valves. In addition, gear operators or actuators are not normally required to operate the compact trunnion type manifold ball valve until larger sizes and higher pressure classes of valves are used in service.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a sectional view of a compact manifold ball valve constructed according to the principles of the present invention and representing the preferred embodiment of the invention;

FIG. 2 is a sectional view taken along line 2—2 of FIG. 1 and showing the ball valve in the fully open position thereof;

FIG. 3 is an end elevational view of the valve of FIGS. 1 and 2 with the actuating handle and rotatable ball thereof being shown in the open position of the valve;

FIG. 4 is a sectional view of a major portion of the ball valve mechanism of FIGS. 1–3 and showing body, seat, stem seal and valve actuating components thereof by exploded view;

FIG. 5 is a sectional view of a compact manifold ball valve differing from the preferred embodiment of FIG. 1 only in that weld end flanges are shown in bolted connection therewith for welded connection of the valve within a conduit, and the FIG. 5 further showing all of the elastomer and polymer seals thereof having been destroyed by heat;

FIG. 6 is a sectional view taken along line 6—6 of FIG. 5 and showing the valve actuating mechanism and flow control ball being at the fully closed positions thereof;

FIG. 7 is a fragmentary sectional view of the compact manifold ball valve of FIG. 1 and showing trunnion support and heat resistant sealing components of the seat which remain effective in the event elastomer and polymer sealing elements are destroyed by heat;

FIG. 8 is a fragmentary sectional view of the compact manifold ball valve of FIG. 1 and showing seat and seat retainer components and further showing the seal components that maintain sealing in the event elastomer and polymer sealing elements are destroyed by heat;

FIG. 9 is a fragmentary sectional view of the compact manifold ball valve of FIG. 1 and showing bonnet and stem seal components and further showing the seal components that maintain sealing in the event elastomer and polymer sealing elements are destroyed by heat;

FIG. 10 is a fragmentary sectional view of the compact manifold ball valve of FIG. 1 and showing bonnet and stem seal components and further showing metal-to-metal contact of components of the bonnet and valve body to maintain sealing in the event the bonnet sealing elements are destroyed by heat;

Figure 1:
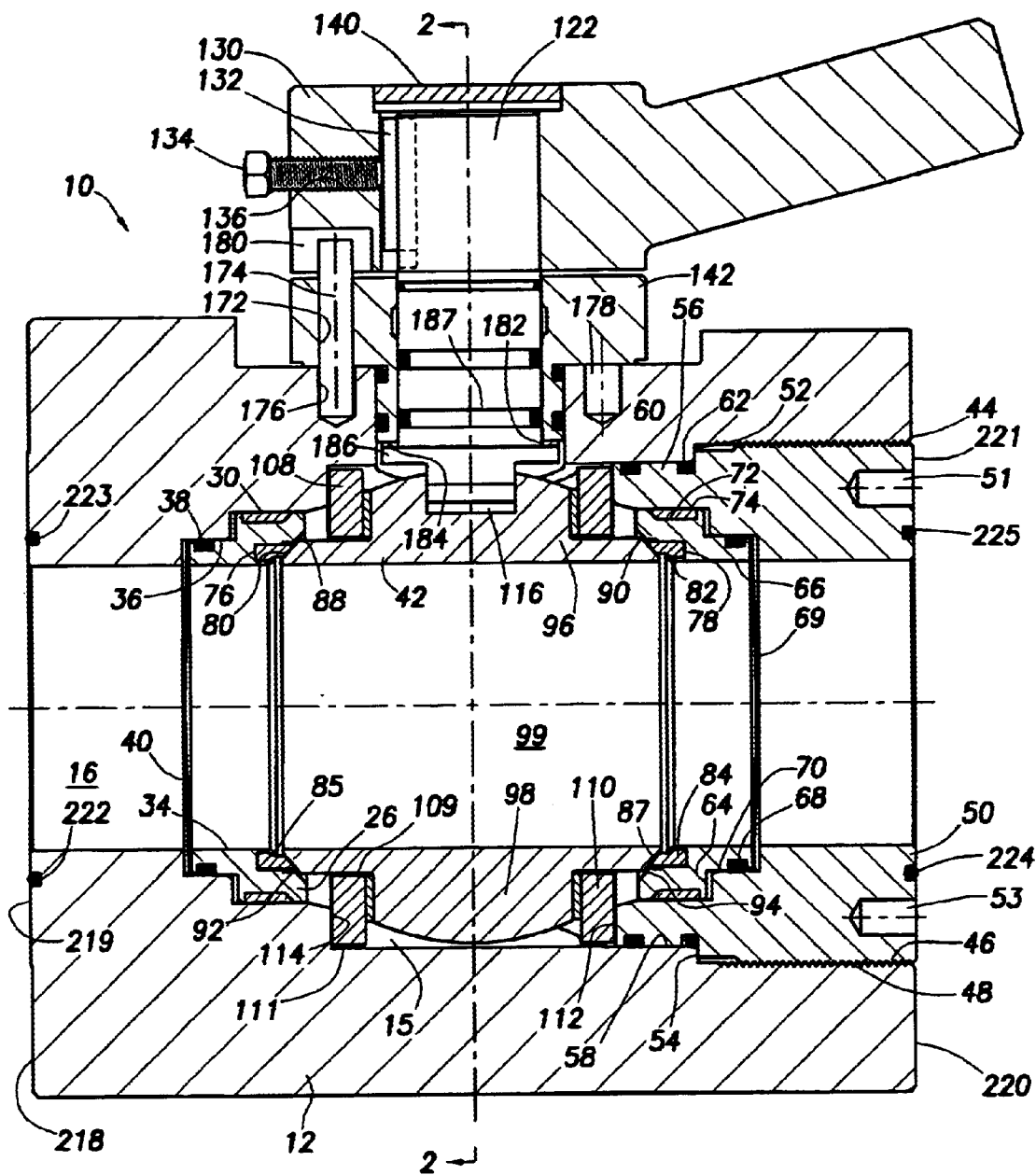
Figure 2:
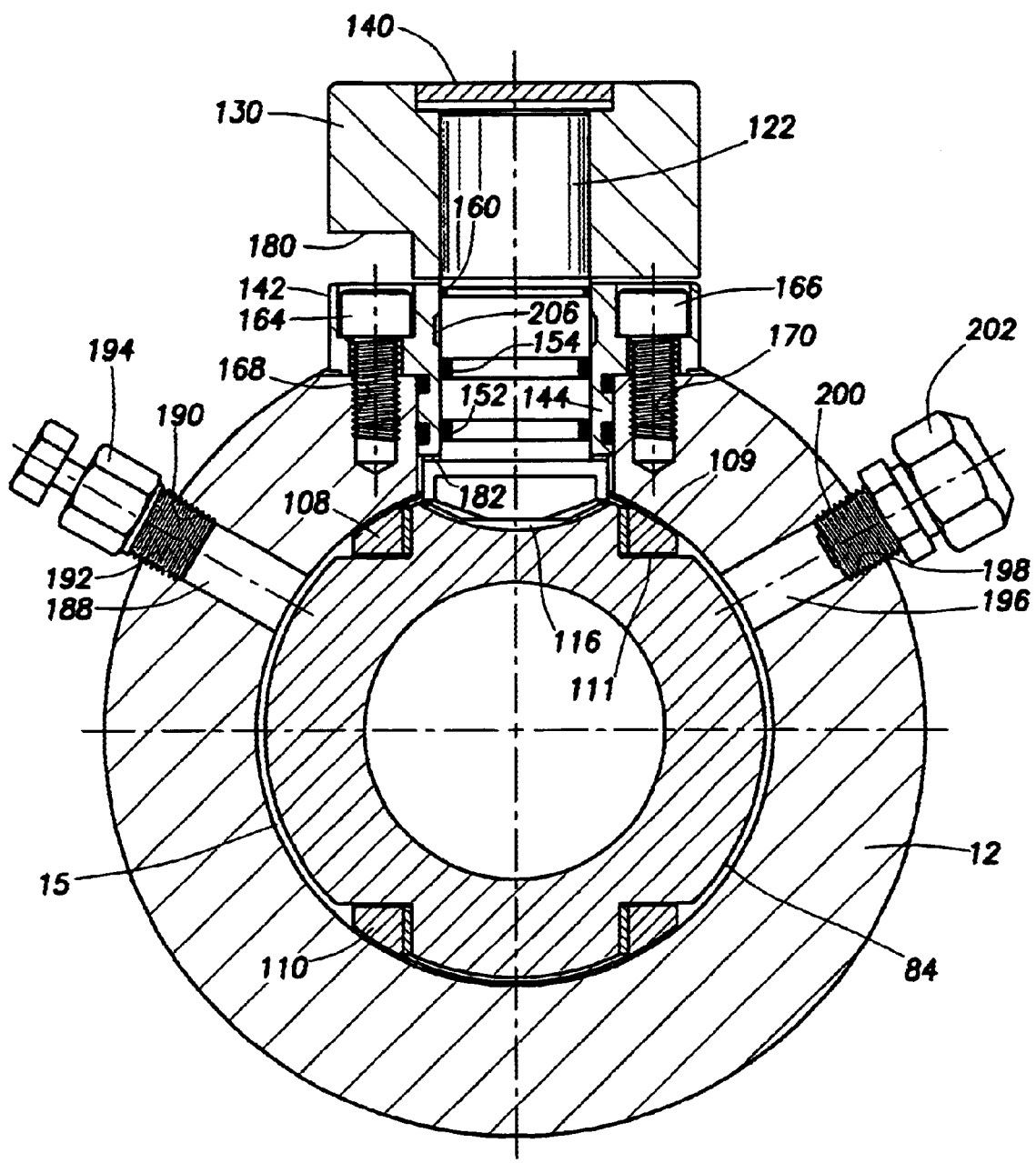
Figure 11:
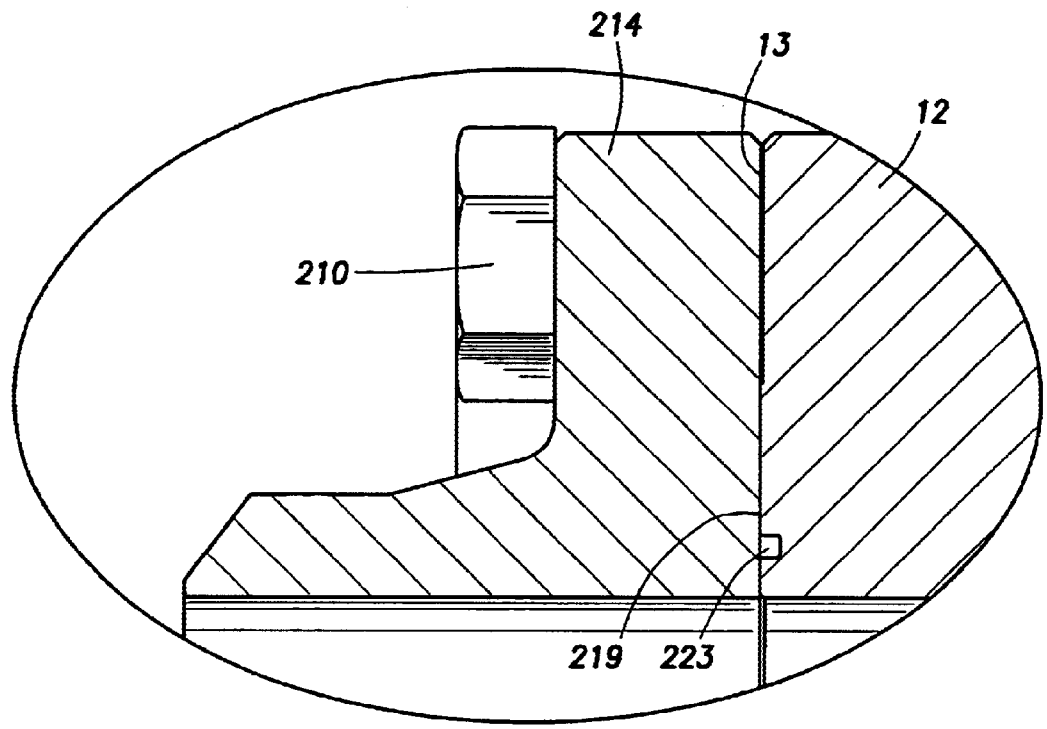
Figure 12:
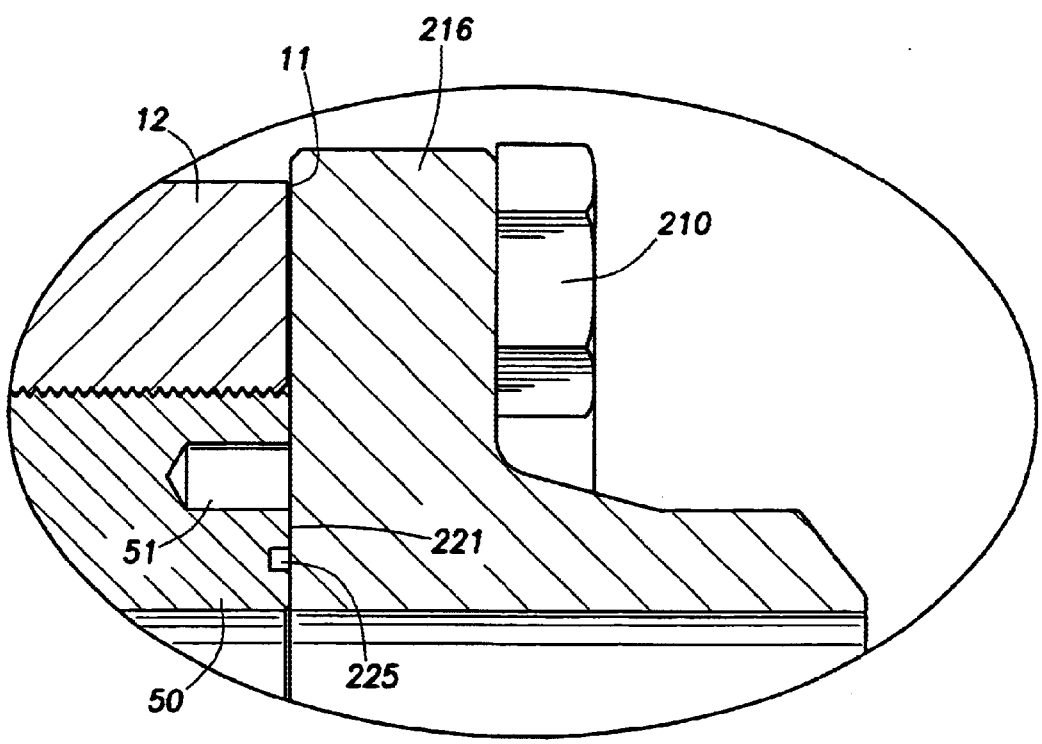

FIG. 11 is a fragmentary sectional view of the compact manifold ball valve of FIG. 1 showing an end connection member being secured by bolts or threaded stud and nut assemblies and sealed to an end of the valve body structure; and FIG. 12 is a fragmentary sectional view of the compact manifold ball valve of FIG. 1 showing an end connection member being secured by bolts or threaded stud and nut assemblies to the opposite end of the valve body structure for sealing with the seat retainer element of the valve mechanism.

DETAILED DESCRIPTION OF PREFERRED EMBODIMENT

Referring now to the drawings and first to FIGS. 1, 2, 3, 4 and 5 a compact manifold ball valve embodying the principles of the present invention is shown generally at 10 and incorporates a valve body 12 having a first axial end 11 and a second axial end 13. The valve body 12 defines an internal valve chamber 15 and a flow passage 16 in communication with the valve chamber 15. The valve body 12 defines a cylindrical bore 18 forming a bonnet and actuating stem receptacle 20 which is also in communication with the valve chamber 14 as is evident from the exploded view of FIG. 4.

The valve body 12 also defines a stepped internal seat recess 22 within which is located an annular seat assembly 24. The seat assembly 24 has a circular seat body structure 26 having an outer peripheral seal groove 28 within which is received a circular heat resistant seal 30 having sealing engagement with a circular sealing surface 32 of the seat recess 22. The annular seat assembly 24 also defines a circular axially extending projection 34 which is disposed within a circular internal sealing surface 36 of the seat recess 22 and is sealed with respect to the circular sealing surface 36 by a circular sealing assembly 38 that is retained within an outer peripheral seal groove of the axial extension 34 for sealing engagement with the circular sealing surface 36. A circular wave spring 40 is also received within the seat recess 22 and applies a continuous force to the annular seat assembly 24 urging it in a direction toward the valve chamber 15 for sealing engagement with a rotary valve ball 42 in the manner discussed in detail hereinbelow. The annular seat assembly 24 is also pressure energized in that it is urged in a direction toward the spherical sealing surface of the valve ball 42 by the pressure being applied toward the back annular seal assembly 38. The back seal, which is defined by the annular seal assembly 38 is of greater diameter than the diameter of sealing engagement of the polymer face seal element 80 of the seat assembly 24 with the spherical sealing surface of the valve ball 42 as will be discussed hereinbelow. The pressure of the fluid being controlled, acting on the area differential of the back face seal as compared with the face seal, will develop a resultant force acting on the seat assembly 24 in a direction toward the valve ball 42. Thus, the greater the pressure of the fluid medium being controlled by the valve mechanism, the greater the sealing capability of the seat assemblies 24 and 66 of the valve mechanism. Since the seat assemblies are pressure energized as well as spring urged into sealing relation with the spherical sealing surface of the valve ball, the fluid pressure within the valve chamber can be bled off, and a feature known as "double block and bleed testing" can be accomplished to ensure seat sealing integrity. Additionally, with the valve chamber bled off, it is possible to remove the bonnet and vale stem assembly, such as for replacement of seals or replacement of the entire bonnet and stem assembly, while the valve is in service and under pressure.

Figure 8:
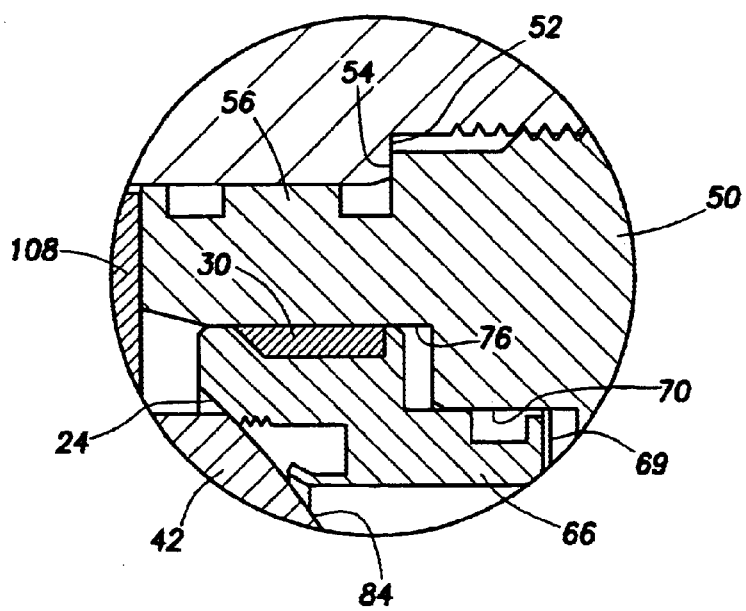

The valve body 12 defines an end opening 44 having an internally threaded section 46 which receives the externally threaded section 48 of a retainer element 50. Since the seat assemblies are pressure energized as well as spring urged into sealing relation with the spherical sealing surface of the valve ball, the fluid pressure within the valve chamber can be bled off, and a feature known as "double block and bleed testing" can be accomplished to ensure seal integrity. Additionally, with the valve chamber bled off, it is possible to remove the bonnet and valve stem assembly, such as for replacement of seals or replacement of the entire bonnet and stem assembly, while the valve is in service and under pressure. The retainer element 50 functions as a seat retainer, but it also provides additional functions. The retainer element 50 serves to retain and position the seat assembly 66 of the valve mechanism and to provide for positioning of trunnion supports and trunnion bearings of the valve as will be described in greater detail herein. To ensure precision positioning of the retainer element 50 relative to the valve body and to provide an additional fire-safe feature, the valve body defines an internal circular stop or retainer locator shoulder 52. The locator shoulder 52 is engaged by a circular stop shoulder 54 of the retainer element 50 to ensure proper positioning of the retainer with respect to internal surfaces and internal components of the valve body as shown in detail in FIG. 8. The circular stop shoulder is moved into metalto-metal sealing engagement by threading the retainer element to its fully seated position within the valve body. This metal-to-metal sealing engagement ensures that virtually no leakage between the valve body and retainer element 50 will occur even under circumstances where the seals thereof will have been destroyed by excessive heat. For its installation and removal, the retainer element 50 defines spanner wrench receptacles 51 and 53 which receive the drive elements of a spanner wrench, not shown, to provide for threading of the retainer element to its fully seated position within the valve body 12 and also permit removal of the retainer element 50 during repair operations Additionally, for sealing of the retainer element 50 to the valve body 12 for normal temperature valve operation, elastomer sealing is provided. The retainer element 50 defines a circular, axially extending sealing projection 56 which is received within a cylindrical internal sealing surface 58 defined within the valve body 12 and is sealed with respect to the valve body 12 by annular seals or seal assemblies 60 and 62 which are carried within circular seal grooves defined in the outer periphery of the axially extending circular sealing projection 56. The internal cylindrical sealing surface, together with the end opening 44, defines a valve chamber access passage of sufficiently large dimension to permit movement therethrough of the valve ball 42 and annular trunnion supports and trunnion bearings as is evident from the description and drawings of this specification. This feature permits assembly and disassembly of the valve mechanism by moving these components endwise through the valve body. The seals or seal assemblies 60 and 62 provide sealing within a normal operating temperature range. In the event of failure of these elastomer or polymer seals, the metal-to-metal sealing of shoulder surfaces 52 and 54 will prevent or at least minimize leakage of fluid from the valve mechanism.

The retainer element 50, which may also be referred to as a seat retainer, defines a stepped internal seat recess 64 within which is movably received an annular seat assembly 66, which may be identical to the annular seat assembly 24. The seat assembly 66 is sealed with respect to the seat retainer 50 by a circular sealing assembly 68, also referred to as a back seal, that is received within a circular seal groove of the seat assembly 66. The back face sealing assembly 68 establishes sealing with an internal cylindrical sealing surface 70 which is defined within the retainer element 50 and forms part of the seat recess 64. The circular sealing assembly 68 may also be defined as a normal operating temperature range sealing assembly 68 which may be composed of elastomer and polymer components capable of accomplishing effective sealing at normal operating temperatures and at all pressure ranges. The annular seat assembly 66 is urged in a direction toward the spherical sealing surface of the valve ball 42 by a wave spring 69 that is disposed within the seat recess 64 of the seat retainer 50.

In the event of extremely high temperatures, such as would occur in the event of fire, the face seal 82 and back seals 68 of the seat assembly 66, which are designed for service within a normal operating temperature range, will be subject to heat destruction. To provide for sealing under high temperature conditions the annular seat assembly 66 is provided with an external seal groove 72 within which is located a high temperature resistant seal 74 having sealing engagement with a circular sealing surface 76. The high temperature resistant seal 74, which will typically be composed of a braided graphite filament material may also be referred to as a grafoil seal. This high temperature resistant seal 74 will not become sublimated or destroyed in the event extremely high temperature conditions are encountered. Even when the elastomer and polymer seals have been destroyed by heat, the high temperature resistant seals 30 and 74 will maintain sufficient sealing capability to qualify the valve mechanism as being fire-safe according to industry standards.

Each of the seat assemblies 24 and 66 defines face seal recesses 76 and 78 respectively within which are disposed circular face sealing elements 80 and 82 that project slightly beyond the respective seat rings for sealing engagement with the spherical sealing surface 84 of the valve ball member 42. To minimize the potential of the face sealing elements 80 and 82 being displaced from their respective face seal grooves, especially by the fluid force or suction that is typically developed by high velocity fluid flow during initial opening of the valve ball, the seat structure defines deformable retainer rims 85 and 87 that are deformed by crimping to lock the face sealing elements within the respective face seal recesses. The face sealing elements 80 and 82 will typically be composed of an elastomer or polymer material having effective sealing engagement with the spherical surface of the valve ball 42 within the operating pressure and temperature range for which the valve mechanism is designed. These face sealing elements 80 and 82, however, are subject to destruction in the event extremely high temperature conditions are encountered. Thus, it is desirable to provide the seat assemblies of the valve mechanism with the capability for establishing sealing with the valve ball 42 under circumstances where the face seal elements 80 and 82 may be destroyed by heat. Accordingly, each of the seat assemblies 24 and,66 defines a metal sealing surface, 88 and 90 respectively, that are located to establish sealing engagement with the spherical surface segments 92 and 94 of the valve ball 42 under conditions where the face sealing elements 80 and 82 will have been destroyed by excessive heat. The sealing surfaces 88 and 90 may be of spherical or conical surface configuration if desired and will establish metal-to-metal fire-safe sealing engagement with the spherical surface of the valve ball 42.

It is desirable that the valve ball 42 be maintained substantially centralized within the valve chamber 15 of the valve body 12 during normal operating conditions and that the valve ball have the capability of shifting responsive to pressure to establish or maintain a centered relation with one of the valve seats, thus providing the capability for metal-to-metal sealing between the seat assemblies and the valve ball in the event elastomer or polymer seals of the seat assemblies may be destroyed by excessive heat. To accomplish this feature, the valve ball 42 is a trunnioned valve ball defining integral opposed trunnion elements 96 and 98 and having a flow port 99 for registry with the flow passages of the valve body and the retainer element 50 when the valve ball is in its open position.

The trunnion elements 96 and 98 of the valve ball are configured to define cylindrical surfaces 100 and 102 about which are received trunnion bearings 104 and 106 respectively. Also provided within the valve chamber 15 of the valve body are a pair of turnnion support elements 108 and 110 which contain partially cylindrical configurations on the outer surfaces and which are disposed about the trunnion bearings 104 and 106 to thereby provide for rotary support of the ball member 42 within the valve chamber 15. The trunnion support elements have axial clearances with respect to the valve ball structure and with the valve body structure as shown in FIGS. 1, 2 and 5–9, which permit the valve ball, even though it is trunnion supported, to shift axially perpendicularly or horizontally and thus ensure precise centering of the valve ball and valve seats with respect to one another. This feature promotes efficient sealing engagement between the valve seats and valve ball when the valve is assembled and also enhances the metal-to-metal sealing capability of the valve mechanism in the event the seals of the valve should become damaged by excessive heat. The trunnion support elements 108 and 110 are in turn supported axially by a cylindrical shoulder surface 114 of the valve body 12 and the cylindrical end face 112 of the axially extending projection 56 of the retainer element 50, thus ensuring that the trunnion bearings 104 and 106 and trunnion support elements 108 and 110 establish centered positioning of the valve ball 42 within the valve chamber 15.

Figure 6:
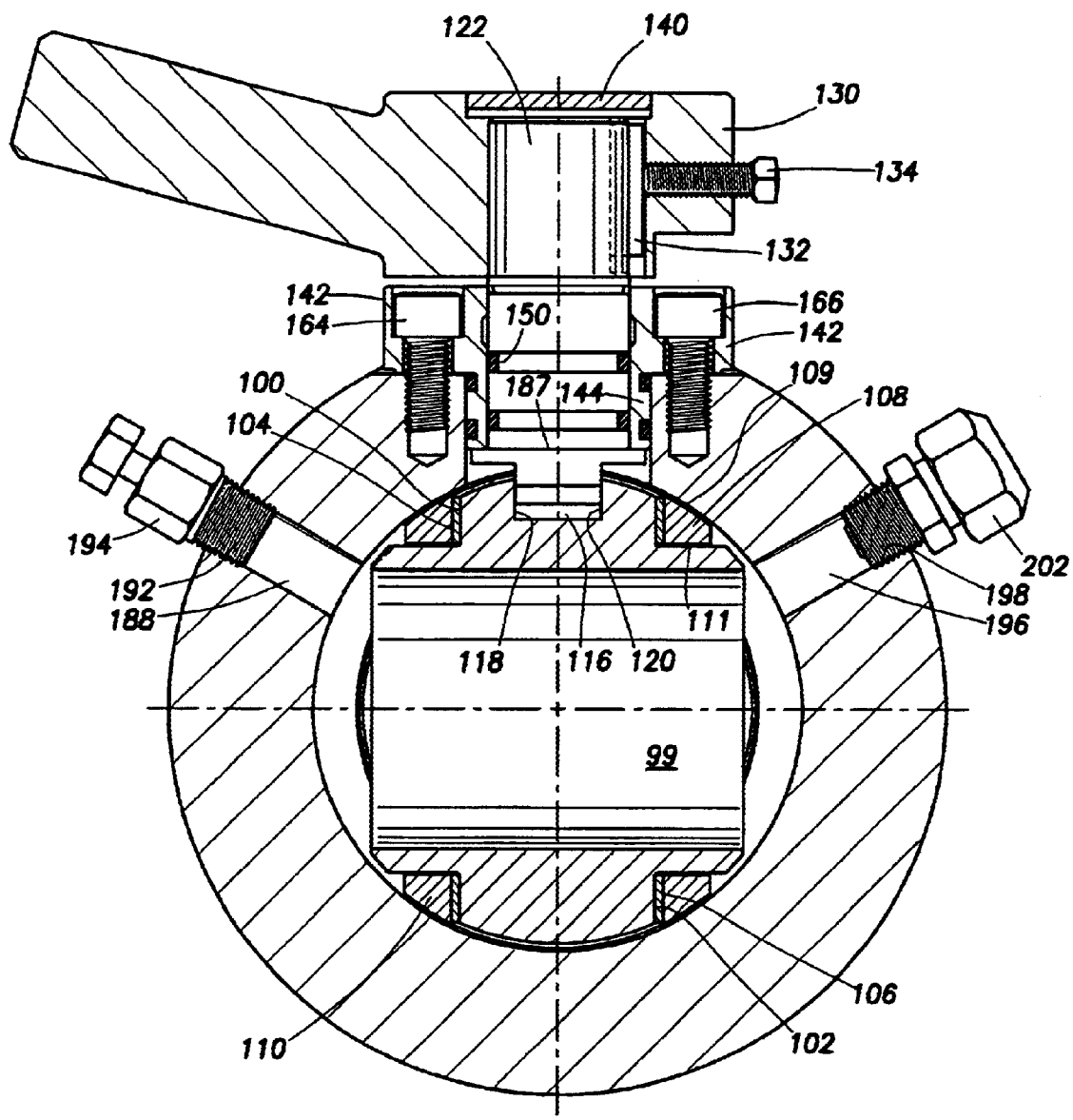
Figure 7:
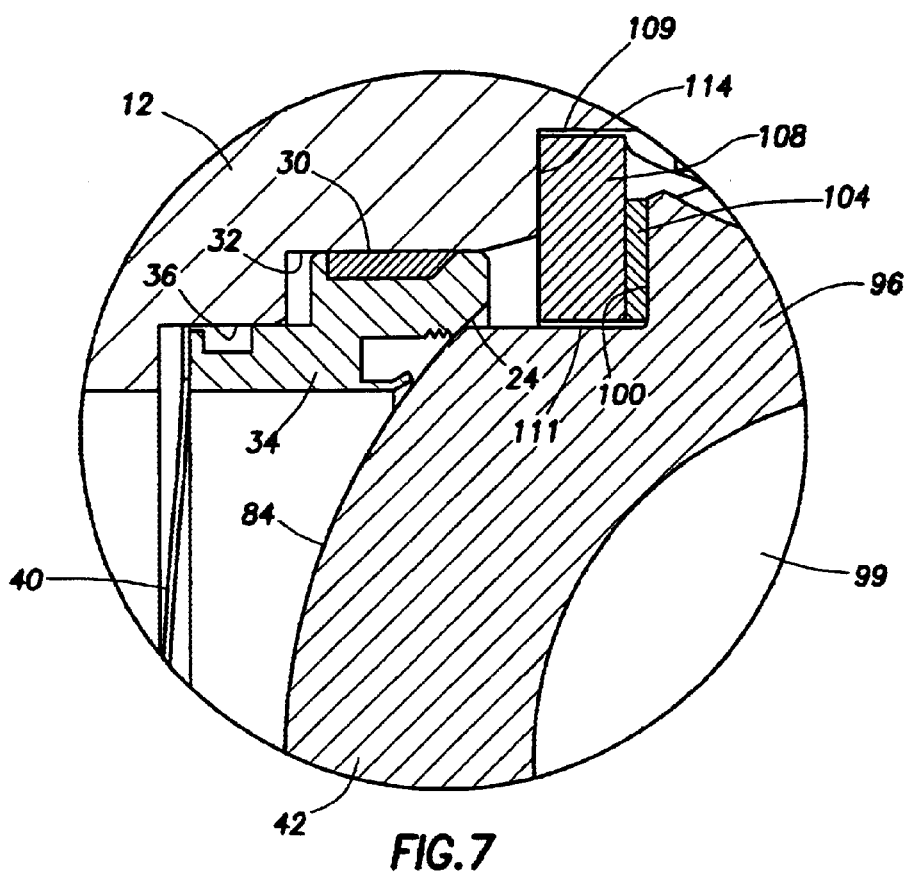

The trunnion element 96 of the valve ball 42 defines a non-circular actuator receptacle 116 having opposed substantially planar internal surfaces 118 and 120 as shown in the sectional view of FIG. 6. An actuator stem 122 is provided which extends through the actuator stem passage 20 of the valve body 12. The actuator stem 122 is provided with a ball drive element 124 having opposed substantially planar drive surfaces 126 and 128. The ball drive element 124 is received within the non-circular actuator receptacle 116 and establishes non-rotatable relation of the actuator stem 122 with respect to the actuator receptacle 116 of the trunnion element 96. An actuating handle 130 is maintained in non-retainable relation with respect to the actuator stem 122 by a drive key element 132 which is received by key slots of the actuator stem 122 and actuator handle 130. A retainer bolt 134 is received within a threaded opening 136 of the actuator handle 130 and serves to lock the key element 132 in place. The actuator handle is also provided with a stem receptacle 138 within which the actuator stem 122 and drive key element 132 are received. A closure cap 140 is seated within an enlargement of the stem receptacle 138 and prevents dirt and other debris from interfering with the valve actuating mechanism. Although the valve mechanism shown in the drawings is depicted with an actuating handle to adapt the valve mechanism for manual operation, such is not intended to limit the spirit and scope of the present invention. If desired, the actuating stem 122 may be rotated between open and closed positions by any suitable mechanical, electrical, pneumatic or hydraulic actuator if desired. To obtain sealing between the valve body 12 and the actuating stem 122 it is appropriate to provide a packing or stem sealing assembly. A bonnet element 142 is fixed to the valve body 12 and defines a generally cylindrical sealing extension 144 having spaced circular seal grooves within which are located circular seals or seal assemblies such as shown at 146 and 148. The sealing extension 144 is located within the bonnet and actuating stem receptacle 20, thereby positioning the circular sealing elements 146 and 148 for sealing engagement with the internal cylindrical sealing surface 18 of the bonnet and actuating stem receptacle 20. The bonnet element 142, including the generally cylindrical sealing extension 144 defines an internal cylindrical sealing surface 150. The actuator stem 122 is provided with circular sealing elements or seal assemblies 152 and 154 which are located within spaced seal grooves 156 and 158 of the actuator stem 122 and which establish sealing engagement with the cylindrical internal sealing surface 150. The seal assemblies 152 and 154 may incorporate two or more sealing elements as shown and may conveniently take the form of high pressure seals which maintain sealing engagement between the actuator stem 122 and the bonnet cylindrical internal sealing surface 150 during rotation of the actuator stem 122. An additional sealing element 160 may also be supported within a circular seal groove of the actuator stem to serve as a weather seal for sealing engagement with a cylindrical surface segment 162 within the bonnet element 142. The weather seal element 160 will ensure that water and other contaminants do not enter between the actuator stem 122 and the bonnet cylindrical internal sealing surface 150. As is evident from FIG. 2 the bonnet element 142 is secured in fixed relation with respect to the valve body 12 by two or more cap screws or bolts 164 and 166 that extend through bolt holes in the bonnet element 142 and are received by internally threaded openings 168 and 170 of the valve body 12.

The bonnet element 142 is also provided with a locator opening 172 within which is received a stop pin 174 that also extends into one of two or more stop pin openings 176 and 178 in valve body 12 to ensure proper positioning of the bonnet element 142 relative to the valve body 12 as shown in FIG. 1. The upper portion of the stop pin 174 projects above the bonnet element 142 and is received within an arcuate stop receptacle 180 that is defined by the actuating handle 130. The arcuate receptacle 180 permits 90 degrees of rotation of the actuating handle 130 to thereby permit movement of the valve ball 42 between its open and closed positions with respect to seat assemblies 24 and 66. By providing a pair of stop pin receptacles 176 and 178 the bonnet element 142 may be appropriately positioned for reversal of the position of the actuating handle 130 in the event such is desired by the user.

Figure 5:
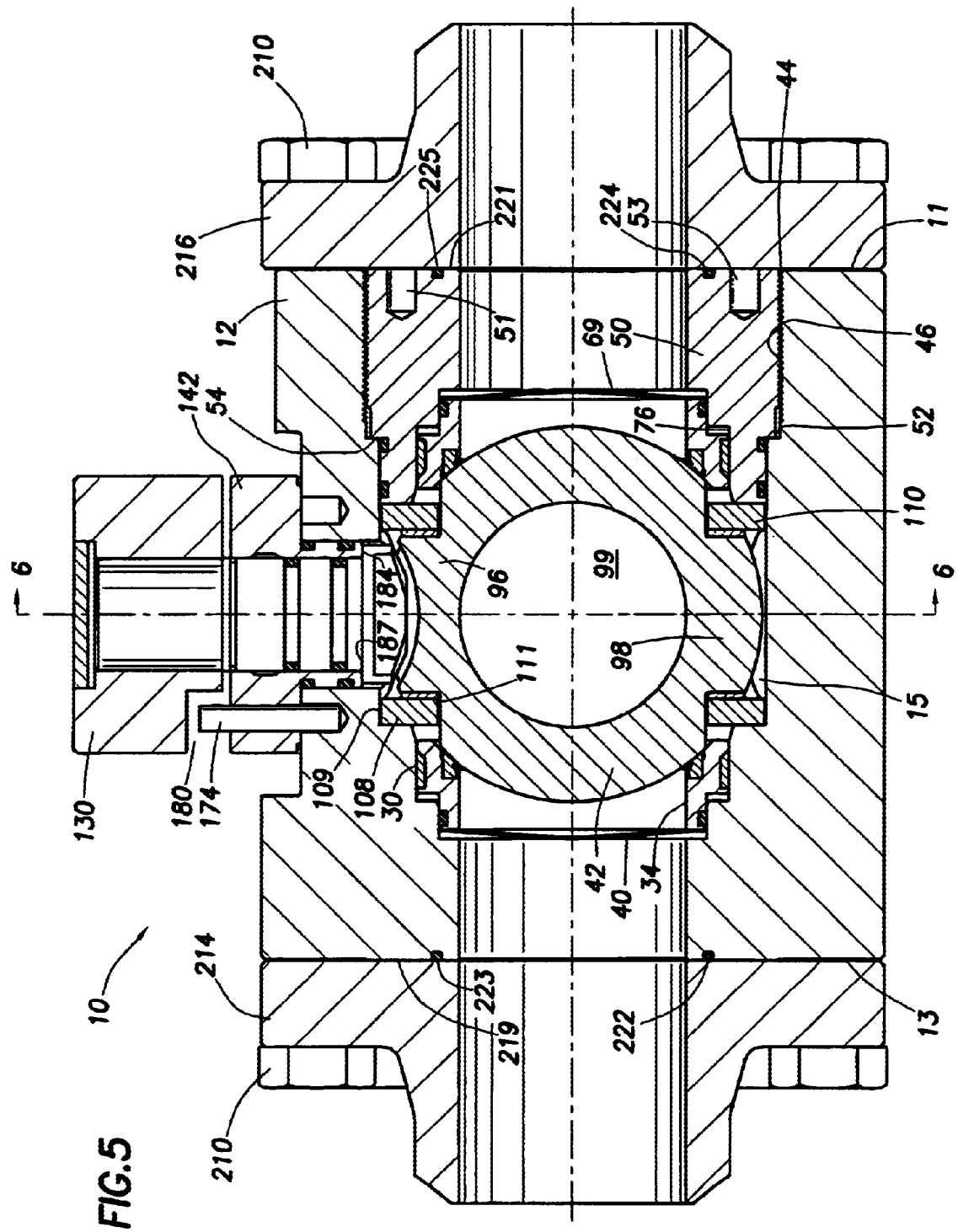
Figure 10:
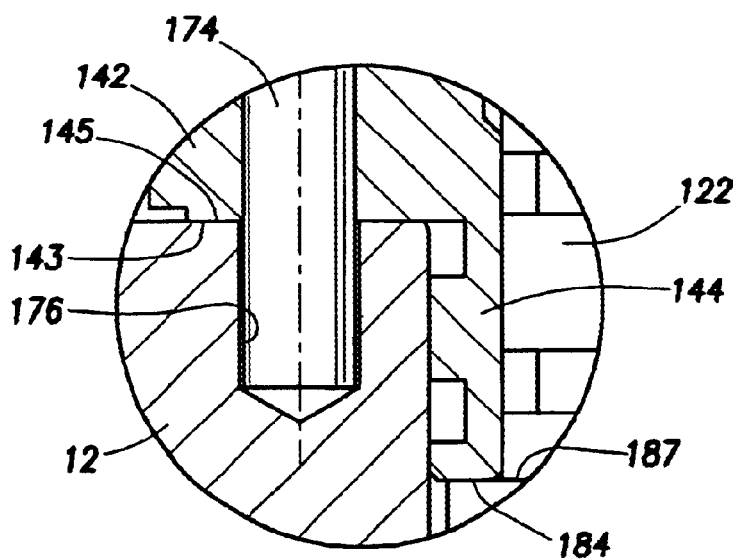

An actuating stem thrust bearing 182 is interposed between the inner end 184 of the bonnet extension 144 and a thrust flange 186 of the actuating stem 122 which defines a circular thrust shoulder 187 which normally contacts the thrust bearing 182. The thrust bearing 182 is typically composed of a low friction polymer material such as Delrin, Teflon, Nylon or the like and accommodates thrust forces induced to the actuating stem by the pressure medium being controlled by the valve mechanism and permits ease of rotation of the actuating stem 122 even at high pressure conditions. In the event of excessive heat the stem thrust bearing 182 is likely to be destroyed as depicted in FIG. 5, permitting the actuating stem 122 to be moved outwardly under the influence of fluid pressure. To prevent the actuating stem 122 from pressure induced blow-out under this condition, the circular thrust shoulder 187 of the actuating stem 122 is of greater diameter as compared with the diameter of the internal sealing surface 150 which defines the stem passage and thus will move into restrained contact with the lower or inner end 184 of the generally cylindrical bonnet sealing extension 144 as shown in FIGS. 5 and 10. Thus, blow-out of the actuating stem 122 will be restrained by the bonnet sealing extension 144.

Figure 9:
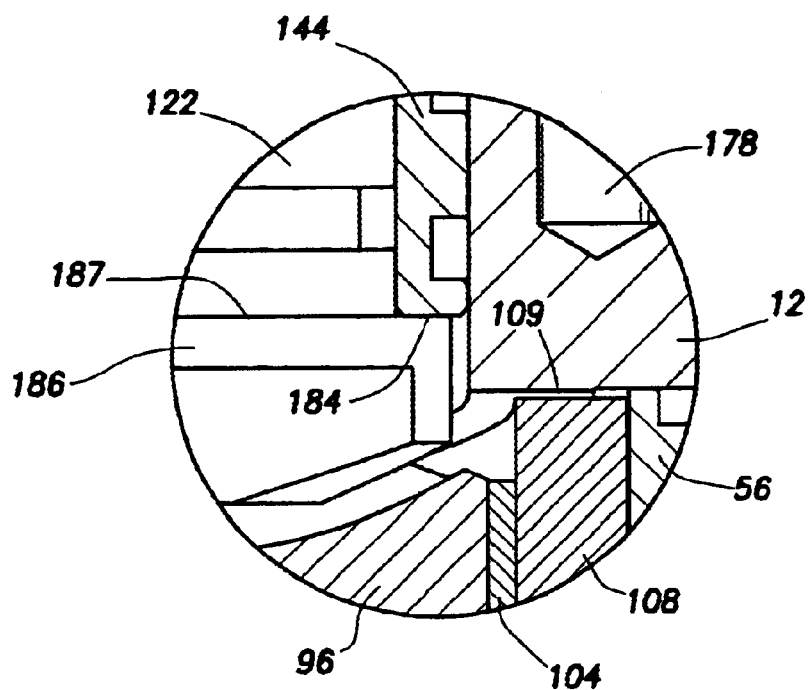

It should also be borne in mind that when the circular thrust shoulder 187 is moved by fluid pressure into seated engagement with the lower end 184 of the bonnet sealing extension 144, as shown in FIG. 9, a metal-to-metal seal is developed which prevents zero to minimal leakage of the fluid medium between actuator stem 122 and bonnet cylindrical internal sealing surface 150 in the event of destruction of seal assemblies 152 and 154. Additionally, as shown in FIG. 10, the bonnet 142 defines a surface 143 which is maintained in metal-to-metal sealing with a planar surface 145 of the valve body 12 by the restraining action of the retainer bolts 164 and 166. Likewise, leakage of fluid between the valve body 12 and bonnet 142 will be substantially prevented by metal-to-metal engagement of the surfaces 143 and 145. Though some minor leakage may occur, it will not be sufficient to significantly feed a fire in the event the fluid medium being controlled by the valve mechanism is of combustible nature.

The valve body structure 12 is also machined to define a vent passage 188 having a threaded section 190 which receives the threaded section 192 of a body vent bleeder fitting 194. The fitting 194 will permit fluid pressure to be bled from the valve chamber 15, such as during double block and bleed testing, in the event such is deemed necessary. Double block and bleed testing of the valve mechanism is made available by the fact that the sealing diameters of the back seals 38 and 68 with the seat recess surfaces 36 and 70 of the valve body are greater than the sealing diameter of the face seals 80 and 82 with the spherical sealing surface 84 of the ball member 42. This feature causes line pressure to continuously urge the seat assemblies into sealing engagement with the valve ball, regardless of the position of the valve ball within the valve body. Thus, with the valve closed, pressure can be bled from the valve body even though line pressure remains within the line. Also, with the valve closed and the valve chamber bled, the valve stem and bonnet assembly may be disassembled and removed from the valve. This feature enables simple and efficient replacement of bonnet and stem seals without requiring that the flow line controlled by the valve be taken out of service. The valve body 12 is also machined to define a lubricant passage 196 having an outer threaded section 198 that receives the threaded connection section 200 of a lubricant fitting 202. An appropriate lubricant supply such as by a lubricant hand pump can be connected to the lubricant fitting 202 and with the lubricant fitting in its opened condition, can be actuated to inject lubricant through the passage 196 into the valve chamber 15 to provide for lubrication of the turnnion bearings and other components of the valve mechanism. The lubricant may also be used to enhance the sealing capability of the valve seat assemblies 24 and 66, as well as assist in reducing operating torque.

Figure 3:
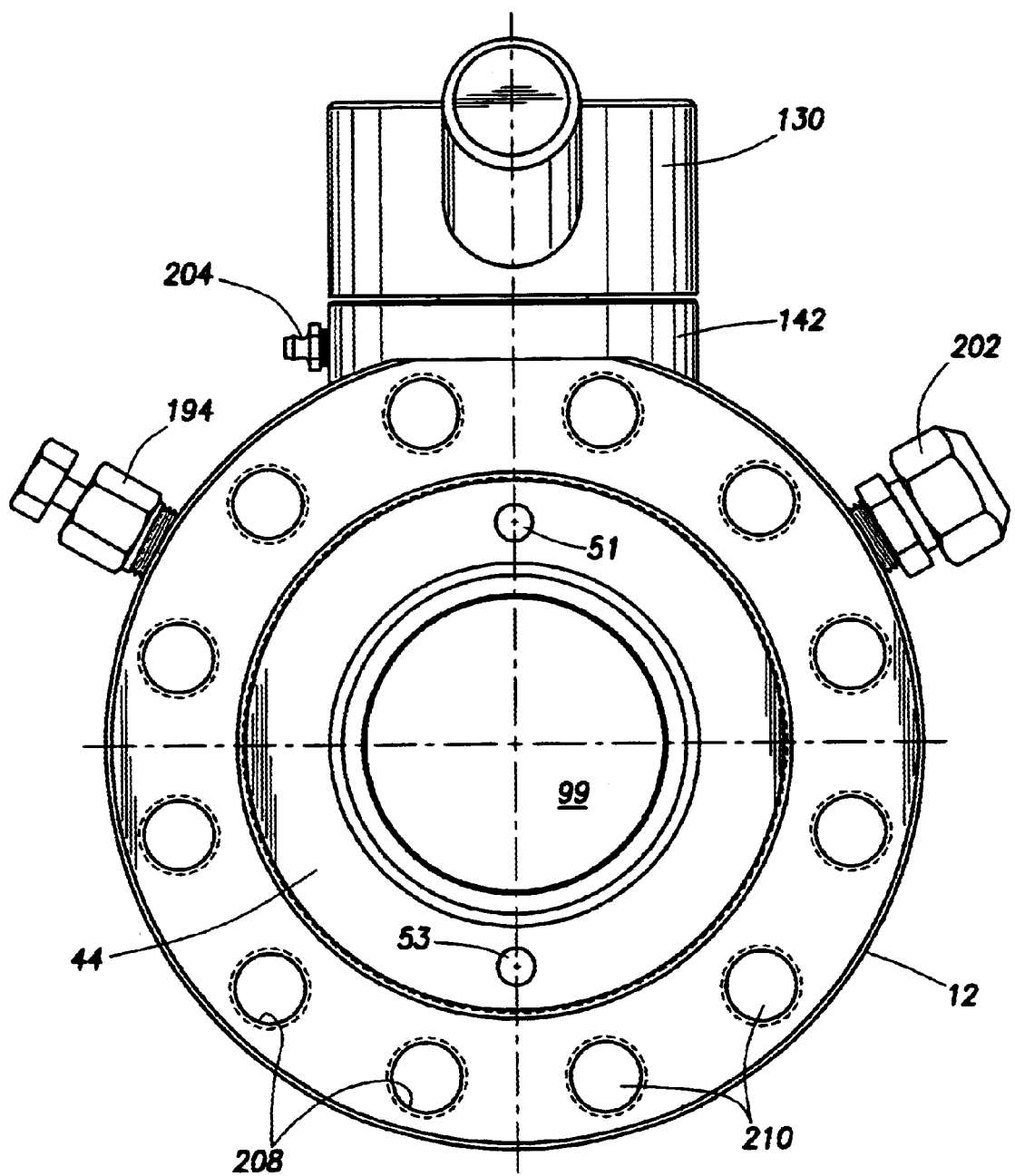
Figure 4:
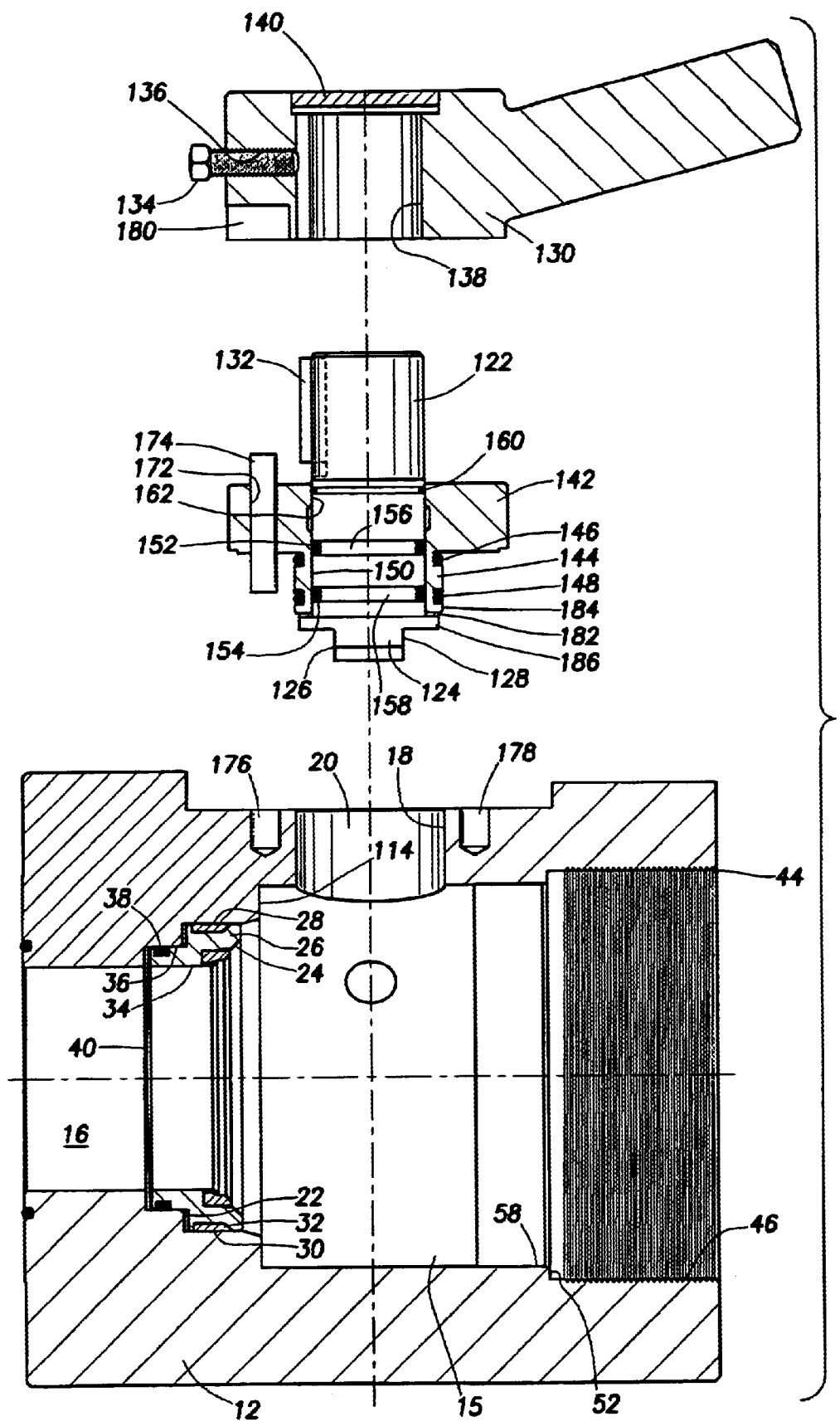

As shown in FIG. 3, the bonnet element 142 is also provided with a grease fitting 204 which is threadedly connected to the outer threaded section of a grease passage having communication with an internal grease chamber 206 that is located about the actuator stem 122 between the stem seal assembly 154 and the stem weather seal 160. This feature permits the sealing capability of lubricating the actuator stem 122 by grease to prevent stem freeze-up and reduce operating torque.

For bolted connection of the valve mechanism into a flow line, the valve body 12 defines a plurality of bolt openings 208 which receive bolts or threaded studs 210 as shown in FIGS. 3, 5, 11 and 12 to secure end connection members 214 and 216 to respective ends 218 and 220 of the valve body. The end connection members 214 and 216 are in the form of typical pipe flanges, thus permitting the annular valve body to be of minimal axial length for promotion of the compact geometry of the compact manifold trunnion ball valve mechanism. As shown in FIG. 5, the end members or flanges can be beveled in conventional manner for welded connection thereof to respective pipe sections of a standard flow-line conduit. Thus, the valve mechanism does not employ body closure members as is conventionally the case, so that the overall length of the valve body structure can be minimal and requires minimal space for its installation. To enhance the fire-safe characteristics of the valve mechanism the first end 13 of the valve body defines a circular metal sealing surface 219 and the retainer element 50 defines a circular metal sealing surface 221. The inner peripheral portion of the valve body 12 and the seat retainer 50, which define the circular metal sealing surfaces 219 and 221, project slightly axially beyond the respective end surfaces 218 and 220 of the annular valve body 12. With the inner peripheral portions of the flange type end members 214 and 216 disposed in metal-to-metal sealing engagement with the circular metal sealing surfaces, the outer peripheral portions of the flange type end members have stand-off with respect to the axial end surfaces 218 and 220 of the valve body. Thus, when connection bolts 210 are tightened, the circular metal sealing surfaces 219 and 221, which are of less dimension as compared with the dimension of the axial ends of the valve body, are drawn into tight metal-to-metal sealing engagement as well as having circular sealing elements 222 and 224 for sealing under normal temperature conditions. This additional metal-to-metal sealing characteristics of the flange type end members with the axial ends of the valve body thus promotes the fire-safe characteristics of the valve mechanism. Circular end seal elements 222 and 224 are received within circular end seal grooves 223 and 225 of the valve body 12 and seat retainer element 50 respectively and establish sealing with the respective end connection members 214 and 216. In the event of excessive heat due to fire, it is likely that the circular end seal elements will be destroyed. Ordinarily seal destruction of this nature would permit leakage of fluid from the flow line connection with the valve body. The end connection members 214 and 216 are in the form of typical pipe flanges, thus permitting the annular valve body to be of minimal axial length for promotion of the compact geometry of the compact manifold trunnion ball valve mechanism. As shown in FIG. 5, the end members or flanges can be beveled in conventional manner for welded connection thereof to respective pipe sections of a standard flow-line conduit. Thus, the valve mechanism does not employ body closure members as is conventionally the case, so that the overall length of the valve body structure can be minimal and requires minimal space for its location. In the case of the present invention, however, the metal-to-metal sealing contact of the end connection members 214 and 216 with the respective metal sealing surfaces 219 and 221 will prevent such leakage or limit leakage to a permissible rate for rating of the valve mechanism as fire-safe according to industry standards. The inner peripheral portion of the valve body 12 and the seat retainer 50, which define the circular metal sealing surfaces 219 and 221, project slightly axially beyond the respective end surfaces 11 and 13 of the annular valve body 12. With the inner peripheral portions of the flange type end members 214 and 216 disposed in metal-to-metal sealing engagement with the circular metal sealing surfaces, the outer peripheral portions of the flange type end members have stand-off with respect to the axial end surfaces 11 and 13 of the valve body. Thus, when connection bolts 210 are tightened, the circular metal sealing surfaces 219 and 221, which are of less dimension as compared with the dimension of the axial ends of the valve body, are drawn into tight metal-to-metal sealing engagement as well as having circular sealing elements 222 and 224 for sealing under normal temperature conditions. This additional metal-to-metal sealing characteristic of the flange type end members with the axial ends of the valve body thus promotes the fire-safe characteristics of the valve mechanism.

Blow-out Proof Seat Retainer Feature

The seat retainer of the preferred embodiment of the present invention is blow-out proof by utilizing a threaded connection of the seat retainer to an internally threaded section of the body. This feature permits removal of the piping from the seat retainer end of the valve while the valve is in its closed position and the opposite end is under full rated working pressure, without the possibility of the seat retainer blowing out of the body and potentially causing equipment damage or injury to personnel. Competitive compact manifold valves do not have the capability for partial disconnection of the valve from the flow conduit while the valve is under pressure.

Blow-out Proof Actuator Stem

The actuator stem of the valve mechanism of the present invention is of generally cylindrical configuration with a large diameter at the lower end which faces toward the valve ball and which creates a shoulder to develop a blow-out proof feature. The lower end also has a tongue or key configuration for engagement with a recess or slot in the top trunnion of the ball with a preferable 0.003 to 0.006 inch width clearance for free axial movement of the ball in the closed position. This feature facilitates pressure responsive downstream movement of the valve ball, such as in the event of seal destruction by high temperature, and thus permits the valve ball to establish metal-to-metal sealing with the downstream seat. The spring load against the metal seat ring also enhances metal-to-metal sealing between the valves seats and valve ball in the event of seal destruction by high temperature conditions. The valve mechanism is designed with diametrical clearance between the outer cylindrical surfaces of the trunnion supports containing the ball trunnions and the inside diameter of the valve body to permit the ball to shift in any vertical, horizontal or angular position sufficiently to center into both seat assemblies for positive sealing. Thus, the valve ball is self-centering with respect to the metal seat rings so that sealing is accomplished even in the event of high temperature destruction of elastomer or polymer seals. The stem shoulder receives a flat thrust bearing made from a low friction material such as Delrin, Nylon, Teflon and the like. A metallic or graphite material may be used for high temperature service. The upper stem section has circumferential grooves to receive elastomeric seals such as O-rings or other types of circular seals. The upper end of the valve stem projects above the bonnet and has provisions for adaptation of a lever or gear operator for manual operation, or an actuator for power operation, as required to rotate the valve ball between its open and closed positions. Adaptation may be of a variety of methods such as, keyed, pinned, square or hex drive, etc. Since the stem is separate of the ball trunnion, it becomes radially pressure balanced, thus no side loading against the valve stem in the bonnet will occur.

Stem and Bonnet Replacement

Stem and bonnet seals can be replaced without removing the ball valve mechanism from the flow line. With the valve ball in its closed position, the body bleed valve can be opened to bleed the body pressure to atmosphere. This feature facilitates pressure responsive downstream movement of the valve ball, such as in the event of seal destruction by high temperature, and thus permits the valve ball to establish metal-to-metal sealing with the downstream seat. The spring load against the metal seat ring also enhances metal-to-metal sealing between the valve seats and valve ball in the event of seal destruction by high temperature conditions. The valve mechanism is designed with diametrical clearance between the outer cylindrical surfaces of the trunnion supports containing the ball trunnions and the inside diameter of the valve body to permit the ball to shift in any vertical, horizontal or angular position sufficiently to center into both seat assemblies for positive sealing. Thus, the valve ball is self-centering with respect to the metal seat rings so that sealing is accomplished even in the event of high temperature destruction of elastomer or polymer seals. Thereafter, the bonnet and valve stem assembly can be removed, the seals replaced and the bonnet and valve stem assembly can be reinstalled. The upstream and downstream seats, being pressure actuated, will prevent by-pass of fluid pressure to the body from the upstream and downstream flow lines. Alternatively, a replacement bonnet and valve stem assembly having new seals can be installed to quickly restore the valve mechanism to operating condition without necessitating seal replacement.

Improved Seat Design

The face seal insert of each seat assembly is constructed of a relatively hard and resilient synthetic resin, such as those sold under the registered trademarks Delrin, Nylon or Teflon. The seat insert may have either an angular or a concave surface for sealing engagement with the spherical sealing surface of the valve ball. The seat insert is positioned in a circular groove in the face of each metallic seat ring and is retained in the metallic seat ring by deforming a deformable peripheral rim of the seat ring to form a radial crimp. The purpose of this crimp design is to prevent the seat insert from blowing out of the circular face seal groove due to a combination of differential pressure and suction which typically occurs at the instant the valve ball is being rotated to its open condition. The metallic seat ring has a circumferential outer seal groove within which is located heat resistant braided graphite filament material which establishes fire safe type sealing between the valve body and seat rings and assists in providing the valve mechanism with a fire-safe capability.

Double Block and Bleed Feature

The seat assemblies incorporated within the preferred embodiment of the present invention are initially spring activated to urge the seat assemblies into sealing engagement with the spherical surface of the valve ball and causing the seat inserts to have sealing engagement with the valve ball at all pressure conditions. Upon pressure being introduced into the piping system, because the back seals of the seat assemblies have greater diameter that the diameter of the seat inserts, the seat assemblies will become pressure activated. Therefore, as pressure increases, the sealing effect between the seat insert and the valve ball becomes greater. When the valve ball is in its closed position, the seat assemblies are independently pressure activated by upstream pressure and downstream back-pressure. To ensure that the seat assemblies have positive sealing engagement with the spherical sealing surface of the valve ball, a bleeder valve fitting is connected to the valve body and is in communication with the inner body cavity that is defined externally of the valve ball and internally of the valve body. By opening the bleeder valve when the valve ball is in its closed position, examination may be performed to test the integrity of the seals of the seat assemblies with the spherical sealing surface of the valve ball. If the inner body cavity is vented and pressure discharge continues to occur, there is provided an indication that at least one of the face seals or one of the back seals is leaking and therefore should be replaced.

Fire Safe Feature

In the event of excessive heat or fire destroying the seat ring inserts, stem resilient thrust bearing and all elastomeric seals while the piping system is pressurized, the compact manifold ball valve mechanism of the present invention incorporates features preventing the internal product media from excessive leaking downstream or to the atmosphere.

When the valve ball is in the closed position during this condition, the spring load against the metallic seat ring forces the seat ring to make metal-to-metal contact of a precision machined circumferential angular surface of the metallic seat ring with the spherical surface of the ball, thereby shutting off flow through the metallic seat ring bore. Braided graphite filament formed in the circumferential outer groove of the metallic seat ring becomes pressure energized and seals off flow around the periphery of the metallic seat ring.

When the rotary valve ball is in the open position during this condition, pressure within the body cavity will force the stem upward creating sufficient metal-to-metal sealing as the precision machined stem shoulder contacts the bottom face of the bonnet and the bonnet is in precision machined metal sealing contact with the body.

A precision machined surface at the inward end of seat retainer makes metal-to-metal sealing contact with a precision machined internal shoulder in the body and the seat retainer. Precision machined surfaces on the body end and seat retainer face are in metal sealing contact with piping end connections as required.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A compact manifold ball valve, comprising:
   (a) a valve body defining a valve chamber and having first and second substantially planar open ends each defining flange end connection sealing surfaces and a first flow passage intersecting said valve chamber and having a bonnet and valve stem passage also intersecting said valve chamber, said valve body further defining a first seat recess;
   (b) a tubular threaded retainer element being removably located in sealed relation within said second open end of said valve body and defining a second flow passage and a second seat recess;
   (c) a pair of trunnion support elements being positioned and retained within said valve chamber by said tubular threaded retainer element;
   (d) a valve ball having opposed trunnions being supported by said trunnion support elements for rotation within said valve chamber and defining a flow port for registry with said first and second flow passages and having an external spherical sealing surface;
   (e) a valve stem and bonnet assembly being secured to said valve body and having rotary driving relation with said valve ball, said stem and bonnet assembly being sealed with respect to said valve body at said bonnet and valve stem passage;
   (f) first and second metal valve seats being located respectively within said first and second seat recesses and having face seals disposed in sealing engagement with said external spherical sealing surface of said valve ball and back seals establishing sealing respectively with said valve body and tubular threaded retainer element, said valve seats being disposed for metal-to-metal sealing with said external spherical surface of said valve ball in the event of heat destruction of said face seals; and
   (g) high temperature seals maintaining sealing between said first and second valve seats and said valve body tubular threaded retainer element in the event of heat destruction of said back seals.

2. The compact manifold ball valve of claim 1, comprising:
   (a) said seat recesses of said valve body and seat retainer having cylindrical high temperature sealing surfaces;
   (b) said first and second metal valve seats each defining a high temperature seal groove; and
   (c) a high temperature sealing element being located in each high temperature seal groove and having sealing engagement with said having cylindrical high temperature sealing surfaces.

3. The compact manifold ball valve of claim 2, wherein:
   each of said high temperature sealing elements having graphite filament composition for fire-safe sealing of said first and second valve seats in the event of destruction of said face seals and said back seals by heat.

4. The compact manifold ball valve of claim 1, comprising:
   a pair of circular trunnion bearing elements each being interposed between one of said trunnions and one of said trunnion support elements.

5. The compact manifold ball valve of claim 1, comprising:
   said valve seats each defining metal face sealing surfaces for fire-safe sealing contact with said external spherical sealing surface of said valve ball in the event of heat destruction of said face seals thereof.

6. The compact manifold ball valve of claim 1, comprising:
   (a) said valve seats each defining a face seal groove having a respective face seal seated therein; and
   (b) said valve seats each defining a locking rim being deformed by crimping to lock said face seals within said face seal grooves.

7. The compact manifold ball valve of claim 1, comprising:
   said first and second valve seats each having back seals having greater diameter as compared to the sealing diameter of said face seals with said valve ball and causing line pressure acting thereon to develop a resultant force urging said first and second valve seats into sealing engagement with said valve ball.

8. The compact manifold ball valve of claim 1, comprising:
   wave springs being located within said first and second seat recesses and applying spring force to said first and second metal valve seats for maintaining said face seals of said first and second metal valve seats in sealing engagement with said valve ball at all pressure conditions of said compact manifold ball valve.

9. The compact manifold ball valve of claim 1, comprising:
   (a) said valve body defining an internal locator shoulder and defining a retainer stop shoulder;
   (b) said tubular threaded retainer element having a trunnion support locator shoulder and having a stop shoulder disposed for contact with said retainer stop shoulder; and
   (c) said trunnion support elements being secured within said valve chamber by said internal locator shoulder of said valve body and said locator shoulder of said tubular threaded retainer element.

10. The compact manifold ball valve of claim 1, comprising:
(a) said valve body defining a retainer locator shoulder; and
(b) said tubular threaded retainer element engaging and being located by said retainer locator shoulder.

11. The compact manifold ball valve of claim 1, comprising:
(a) said valve body defining an internal retainer sealing surface;
(b) said retainer element defining outer peripheral seal grooves; and
(c) sealing elements being located within said outer peripheral seal grooves and having sealing engagement with said retainer sealing surface.

12. The compact manifold ball valve of claim 1, said valve stem and bonnet assembly comprising:
(a) a cylindrical sealing surface defining at least a portion of said bonnet and stem passage;
(b) a bonnet member being secured to said valve body and having a sealing portion thereof located within said bonnet and stem passage;
(c) at least one sealing element being supported by said sealing portion of said bonnet member and having sealing engagement with said cylindrical sealing surface.

13. The compact manifold ball valve of claim 12, comprising:
(a) said bonnet member defining a generally cylindrical stem passage and defining a cylindrical stem sealing surface;
(b) a valve stem being located for rotation within said generally cylindrical stem passage; and
(c) at least one sealing element establishing sealing between said generally cylindrical stem passage and said bonnet member.

14. The compact manifold ball valve of claim 13, comprising:
said bonnet member defining an internal grease groove and having a grease passage intersecting said internal grease groove and a grease fitting through which grease is supplied to said grease passage and internal grease groove.

15. The compact manifold ball valve of claim 1, comprising:
(a) said bonnet member defining a generally cylindrical stem passage and defining an internal cylindrical stem sealing surface and having a generally cylindrical sealing extension being located within said bonnet and valve stem passage;
(b) a valve stem being located for rotation within said generally cylindrical stem passage and having a thrust flange of greater dimension than said generally cylindrical stem passage for restraining pressure induced stem blow-out; and
(c) at least one sealing element establishing sealing between said generally cylindrical stem passage and said bonnet member.

16. The compact manifold ball valve of claim 15, comprising:
(a) a stop pin projecting externally of said bonnet member,
(b) an actuator handle being connected to said valve stem and defining a handle positioning receptacle receiving said stop pin projection and permitting only quarter turn rotation of said valve stem for opening or closing movement of said valve ball.

17. The compact manifold ball valve of claim 1, comprising:
(a) said first substantially planar end of said valve body defining a first metal sealing surface having a first end seal groove;
(b) said tubular threaded retainer element defining a second metal sealing surface having a second end seal groove;
(c) flange type end connection members being secured to said first and second substantially planar open ends of said valve body and having metal-to-metal sealing contact with said first and second metal sealing surfaces; and
(d) end seal elements being disposed within said first and second end seal grooves and establishing sealing of said flange type end connection members with said first and second metal sealing surfaces.

18. A compact fire-safe manifold ball valve, comprising:
(a) a valve body defining a valve chamber and having first and second substantially planar open ends and a first flow passage intersecting said valve chamber and having a cylindrical sealing surface defining a bonnet and valve stem passage also intersecting said valve chamber, said first substantially planar open end of said valve body having a first metal end sealing surface said valve body defining a first valve seat intersecting said first flow passage and being in communication with said valve chamber, said first valve seat having a high temperature sealing surface;
(b) a threaded retainer element being removably located in sealed relation within said second end of said valve body and defining a second flow passage and a second valve seat intersecting said second flow passage and being in communication with said valve chamber, said retainer element further defining a second metal end sealing surface;
(c) a pair of trunnion support and bearing assemblies being supported within said valve chamber by said retainer element;
(d) a valve ball having opposed trunnions and being positioned by said trunnion support elements for rotation within said valve chamber and defining a flow port for registry with said first and second flow passages and having an external spherical sealing surface;
(e) a valve stem and bonnet assembly being secured to said valve body and having rotary driving relation with said valve ball, said stem and bonnet assembly being sealed with respect to said cylindrical sealing surface of said bonnet and stem passage;
(f) first and second valve seats being located respectively within said first and second seat recesses and having face seals disposed in sealing engagement with said external spherical sealing surface of said valve ball and back seals establishing sealing respectively with said valve body and seat retainer, said valve seats being disposed for metal-to-metal sealing with said external spherical surface of said valve ball in the event of heat destruction of said face seals; and
(g) high temperature seals maintaining sealing between said first and second valve seats and said valve body and seat retainer in the event of heat destruction of said back seals.

19. The compact fire safe manifold ball valve of claim 18, comprising:
   (a) said seat recesses of said valve body and retainer element having cylindrical high temperature sealing surfaces;
   (b) said first and second pressure actuated valve seats each defining a high temperature seal groove; and
   (c) high temperature sealing elements being located in each high temperature seal groove and having sealing engagement with said cylindrical high temperature sealing surfaces.

20. The compact fire safe manifold ball valve of claim 18, comprising:
   (a) said first and second valve seats each having back seals having greater diameter as compared to the sealing diameter of said face seals with said valve ball and causing line pressure acting thereon to develop a resultant force urging said first and second valve seats into sealing engagement with said valve ball;
   (b) said bonnet member defining a generally cylindrical stem passage and defining an internal cylindrical stem sealing surface and having a generally cylindrical sealing extension being located within said bonnet and valve stem passage;
   (c) a valve stem being located for rotation within said generally cylindrical stem passage and having a thrust flange of greater dimension than said generally cylindrical stem passage for restraining pressure induced stem blow-out;
   (d) at least one sealing element establishing sealing between said generally cylindrical stem passage and said bonnet member,
   (e) said first end of said valve body defining a first metal sealing surface having a first end seal groove;
   (f) said retainer element defining a second metal sealing surface having a second end seal groove;
   (g) flange type end connection members being secured to said first and second ends of said valve body and having metal-to-metal sealing contact with said first and second metal sealing surfaces; and
   (h) end seal elements being disposed within said first and second end seal grooves and establishing sealing of said end connection members with said first and second metal sealing surfaces.

21. A compact manifold ball valve comprising:
   (a) a valve body defining oppositely facing generally planar axial ends and defining a valve chamber and a flow passage intersecting said valve chamber, said valve body having a valve stem passage also intersecting said valve chamber;
   (b) a valve ball having opposed trunnion elements and being rotatably positioned within said valve chamber and defining a flow port for registry with said flow passage and having an external spherical sealing surface;
   (c) a valve stem being located for rotary movement within said valve stem passage and having driving relation with said valve ball for rotating said valve ball between open and closed positions within said valve chamber;
   (d) at least one valve seat being located within said valve chamber and having sealing engagement with said external spherical sealing surface of said valve ball;
   (e) a pair of trunnion support elements being located within said valve chamber and being moveable axially, perpendicularly and horizontally within said valve body to permit centering of said valve ball with respect to said at least one valve seat; and
   (f) a pair of flange type end members having bolted and sealed connection with said axial ends of said valve body, said end members and having flow-line connections.

22. The compact manifold ball valve of claim 21, comprising:
   (a) said opposed trunnion elements being integral with said valve ball;
   (b) annular bearing members establishing bearing engagement with said opposed trunnion elements; and
   (c) said pair of annular trunnion support elements being located within said valve chamber and receiving said annular bearing members in supported relation therein, said annular trunnion support elements having axial clearance with respect to said valve body and said valve ball and being capable of shifting within said valve body for maintaining centered relation of said valve ball with respect to said at least one valve seat.

23. The compact manifold ball valve of claim 21, comprising:
   (a) said axial ends of said valve body each defining axially projecting portions defining annular metal sealing surfaces having less diameter than said valve body; and
   (b) inner peripheral portions of each of said flange type end members having metal-to-metal sealing engagement with respective annular metal sealing surfaces of said axially projecting portions and outer peripheral portions of each of said flange type end members having stand-off from said axial ends of said valve body.

24. The compact manifold ball valve of claim 21, comprising:
   a threaded retainer element being removably received in sealed relation within said valve body and defining at least a portion of said flow passage, said retainer element having an axial end defining an annular metal sealing surface for sealing engagement by one of said flange type end members.

25. The compact manifold ball valve of claim 24, comprising:
   (a) said valve body defining a first seat recess and an axially oriented access passage;
   (b) said threaded retainer element being received within said axially oriented access passage and defining a second seat recess; and
   (c) said at least one valve seat being first and second seat members being located within said first and second seat recesses respectively and having sealing engagement with said external spherical sealing surface of said valve ball, said first seat member and said valve ball each being of a dimension permitting movement thereof through said axially oriented access passage during valve assembly or disassembly.

26. The compact manifold ball valve of claim 24, comprising:
   (a) said valve body defining an axial sealing projection extending axially beyond one of said axial ends of said valve body and defining a first circular metal sealing surface having metal-to-metal sealing with one of said end connection members;
   (b) an internal retainer stop being defined by said valve body;

(c) said threaded retainer element engaging said internal retainer stop for precision location thereof relative to said valve body and defining a second circular metal sealing surface projecting axially beyond an axial end of said valve body and having metal-to-metal sealing with another of said flange type end connection members.

27. The compact manifold ball valve of claim 25, comprising:

circular wave spring elements being located within said first and second seat recesses and applying spring force to said valve seats for urging said valve seats into sealing engagement with said spherical sealing surface of said valve ball.

28. The compact manifold ball valve of claim 21, comprising:

(a) said valve ball having trunnion elements each defining cylindrical bearing surfaces;

(b) a first trunnion support shoulder being defined within said valve body;

(c) a second trunnion support shoulder being defined by said tubular retainer element;

(d) generally cylindrical trunnion bearing members being received in journal engagement about said cylindrical bearing surfaces; and (e) annular trunnion support elements having supporting relation with said generally cylindrical trunnion bearing members and having supported engagement with said first and second trunnion support shoulders respectively, said annular trunnion support element being moveable relative to said first and second trunnion support shoulders to permit centering of said valve ball with respect to said at least one valve seat.

29. A compact manifold ball valve, comprising:

(a) a valve body defining a valve chamber and having first and second annular substantially planar axial ends and a first flow passage intersecting said valve chamber and having a bonnet and valve stem passage also intersecting said valve chamber, said valve body defining an axially oriented access passage and first trunnion support shoulders;

(b) a valve ball being positioned for rotation within said valve chamber and having opposed trunnions and defining a flow port for registry with said flow passage and having an external spherical sealing surface;

(c) a pair of seat assemblies located for sealing engagement with said valve ball;

(d) a pair of trunnion bearings being disposed in bearing engagement with said opposed trunnions;

(e) a pair of annular trunnion support elements being positioned about said trunnion bearings and disposed for supported engagement with said first trunnion support shoulders, said trunnion support elements capable of shifting axially, perpendicularly and horizontally to permit centering of said valve ball with respect to either of said seat assemblies;

(f) a valve stem having rotary driving relation with one of said opposed trunnion elements of said valve ball and being sealed with respect to said valve body within said valve stem passage; and (g) a threaded retainer element being removably located in sealed relation within said axially oriented access passage and having second trunnion support shoulders disposed for supporting relation with said annular trunnion support elements within said valve body.

30. The compact manifold ball valve of claim 29, comprising:

(a) a pair of flange type end connection members having sealing engagement with respective first or second substantially planar axial ends of said valve body;

(b) said valve body defining an axial sealing projection extending axially beyond one of said substantially planar axial ends of said valve body and defining a first circular metal sealing surface having metal-to-metal sealing with one of said flange type end connection members;

(c) an internal retainer stop being defined by said valve body; and (d) said retainer element engaging said internal retainer stop for precision location thereof relative to said valve body and defining a second circular metal sealing surface projecting axially beyond the other of said axial ends and having metal-to-metal sealing with another of said flange type end connection members.

31. The compact manifold ball valve of claim 29, comprising:

(a) a first seat recess being defined by said valve body;

(b) a second seat recess being defined by said retainer element; and (c) circular wave spring elements being located within said first and second seat recesses and applying spring force to said valve seats for urging said valve seats into sealing engagement with said spherical sealing surface of said valve ball.

32. The compact manifold ball valve of claim 29, comprising:

(a) said trunnion elements each defining cylindrical bearing surfaces;

(b) a first trunnion support shoulder being defined within said valve body;

(c) a second trunnion support shoulder being defined by said tubular retainer element;

(d) generally cylindrical trunnion bearing members being received in journal engagement about said cylindrical bearing surfaces; and (e) annular trunnion support elements having supporting relation with said generally cylindrical trunnion bearing members and having supported engagement with said first and second trunnion support shoulders respectively, said annular trunnion support elements having clearance with said valve body and said valve ball permitting centering movement of said valve ball with respect to at least one of said seat assemblies.

* * * * *